United States Patent [19]

Sugiyama

[11] Patent Number: 5,066,910
[45] Date of Patent: Nov. 19, 1991

[54] ROTATIONAL SPEED DETECTOR FOR AN INTERNAL COMBUSTION ENGINE COMPRISING A WAVEFORM PROCESSOR FOR ELIMINATING UNWANTED PULSES

[75] Inventor: Naoki Sugiyama, Toyota, Japan

[73] Assignee: Aisin Seiki Kabushiki Kaisha, Kariya City, Japan

[21] Appl. No.: 629,030

[22] Filed: Dec. 19, 1990

Related U.S. Application Data

[63] Continuation of Ser. No. 237,409, Aug. 29, 1988, abandoned.

[30] Foreign Application Priority Data

Aug. 31, 1987 [JP] Japan .................. 62-215353

[51] Int. Cl.[5] ............................................. G01P 3/487
[52] U.S. Cl. .................................. 324/166; 324/170; 324/174
[58] Field of Search .................. 324/160, 161, 166, 163, 324/168, 169, 170, 173, 174, 175, 178, 179, 180, 205.15, 207.25, 225

[56] References Cited

U.S. PATENT DOCUMENTS

| | | | |
|---|---|---|---|
| 3,560,854 | 2/1971 | Moss et al. | 324/161 X |
| 3,603,876 | 9/1971 | Grundy | 324/166 X |
| 3,652,832 | 3/1972 | Baumann | 324/166 X |
| 3,729,989 | 5/1973 | Little | 324/166 X |
| 3,757,167 | 9/1973 | Yoshikawa et al. | 324/160 X |
| 3,832,635 | 8/1974 | Cass | 324/166 |
| 4,050,747 | 9/1977 | Ruhnau et al. | 324/166 X |
| 4,056,287 | 11/1977 | Gudat | 324/160 X |
| 4,072,364 | 2/1978 | Gudat et al. | 324/160 X |
| 4,263,578 | 4/1981 | Fukuhara | 324/166 X |
| 4,509,013 | 4/1985 | Sasao | 324/161 |
| 4,529,932 | 7/1985 | Doueihi et al. | 324/161 |
| 4,569,027 | 2/1986 | Nakano et al. | 324/160 X |
| 4,575,677 | 3/1986 | Dennis | 324/161 |
| 4,680,721 | 7/1987 | Pluddemann | 324/160 X |
| 4,808,933 | 2/1989 | Kobayashi et al. | 324/166 X |
| 4,868,498 | 9/1989 | Lusinchi et al. | 324/173 |
| 4,908,572 | 3/1990 | Sakai et al. | 324/173 |
| 4,982,155 | 1/1991 | Ramsden | 324/174 X |

FOREIGN PATENT DOCUMENTS

54-146651  11/1979  Japan .................. 324/208

Primary Examiner—Kenneth A. Wieder
Assistant Examiner—Warren S. Edmonds
Attorney, Agent, or Firm—Banner, Birch McKie & Beckett

[57] ABSTRACT

A rotational speed detector for an internal combustion engine comprises a waveform processor for eliminating pulses generated within a predetermined period of time after a certain pulse appears and a measuring circuit for measuring a rotational speed based on outputs from the waveform processor. The waveform processor of the rotational speed detector thus eliminates the effects of such an unexpected pulse generated, for example, by the vibration of the ignition coil for the engine. Consequently, the measuring means detects the rotational speed accurately without measuring the unexpected pulse.

12 Claims, 2 Drawing Sheets

ROTATIONAL SPEED DETECTOR FOR AN INTERNAL COMBUSTION ENGINE COMPRISING A WAVEFORM PROCESSOR FOR ELIMINATING UNWANTED PULSES

This application is a continuation of application Ser. No. 237,409, filed Aug. 29, 1988, now abandoned.

BACKGROUND OF THE INVENTION

1. Technical Field

This invention relates to a rotational speed detector for an internal combustion engine.

2. Description of the Relevant Art

The rotational speed of an internal combustion engine for an engine driven heat pump should be controlled accurately and properly to conform with a required rotational speed because the rotational speed is directly related to an air conditioning maintained by the engine-driven heat pump.

Further, if the rotational speed of the engine repeatedly rises and falls, the noise of the engine may be uncomfortable or disturbing.

Furthermore, when the rotational speed of the engine is reduced, the engine may stop due to the load of the heat pump unless the rotational speed of the engine is detected accurately and so controlled.

It is well known in the art to control the amount of the fuel supplied to the engine in response to a difference between an actual rotational speed and the required speed by opening or closing a throttle valve so as to control the rotational speed of the engine.

Under such control, it is required for a detector to detect the actual rotational speed accurately.

Meanwhile, a conventional ignition system comprises an ignition coil which has a primary winding and a secondary winding and supplies high voltage to a spark plug, a permanent magnet which is rotated by the engine, and a switching device which is connected to the primary winding of the ignition coil. When the switching device turns on, magnetic energy charges the ignition coil, and then, when the switching device turns off, the charged magnetic energy is discharged toward the spark plug as a high voltage impulse.

In the conventional device, the rotational speed of the engine is detected by measuring a period of time between the separate events when the switching device repeatedly turns on. Accordingly, an ignition signal between the switching device and the ignition coil is detected in order to measure this period and, consequently, the rotational speed.

Although a D.C. voltage supplied to the ignition coil has a low value of about 12 volts, the detected ignition signal at the point between the switching device and the ignition coil includes a very high voltage impulse of about 270 volts and of high frequency (short duration) as shown in FIG. 6.

Further, this detected voltage sometimes includes an unexpected pulse $F_E$ of longer duration than the high voltage impulse and of low frequency caused, for example, by a vibration of the ignition coil as shown in FIG. 7.

Although the effects of high frequency impulses may be reduced by means of a conventional low pass filter, the unexpected pulse $F_E$ will not reduced by the low pass filter, because the unexpected pulse $F_E$ includes a low frequency signal passed by the filter. Further, this unexpected pulse $F_E$ interferes in the detection of the actual rotational speed, because this unexpected pulse $F_E$ bears a close relation to the rotational speed of the engine.

Accordingly, the conventional device sometimes fails to detect a true rotational speed by acting on the unexpected pulse $F_E$.

SUMMARY OF THE INVENTION

Accordingly, one of the objects of this invention is to obviate the above described conventional drawbacks of inaccurately detecting indicia of true engine speed.

Further, another object of this invention is to discriminate unexpected low frequency pulses generated by, for example, vibration of an ignition coil.

Furthermore, another object of this invention is to detect an actual rotational speed of an engine accurately.

To achieve the above objects, and in accordance with the principles of the invention as embodied and broadly described herein, the rotational speed detector for an internal combustion engine comprises a waveform processor for eliminating pulses generated within a predetermined period of time after a certain pulse appears, and a measuring means for measuring a true rotational speed based on outputs from the waveform processor excluding the effects of such pulses.

In this invention, the unexpected pulse generated by the vibration of the ignition coil is discarded by the waveform processor. Accordingly, measuring means can detect appropriate time periods and calculate the rotational speed accurately without any adverse influence from the above-described pulses.

DETAILED DESCRIPTION OF THE PREFERRED EMBODIMENT

Reference will now be made in detail to the present preferred embodiment of the invention, an example of which is illustrated in the accompanying drawings.

Figure 1:
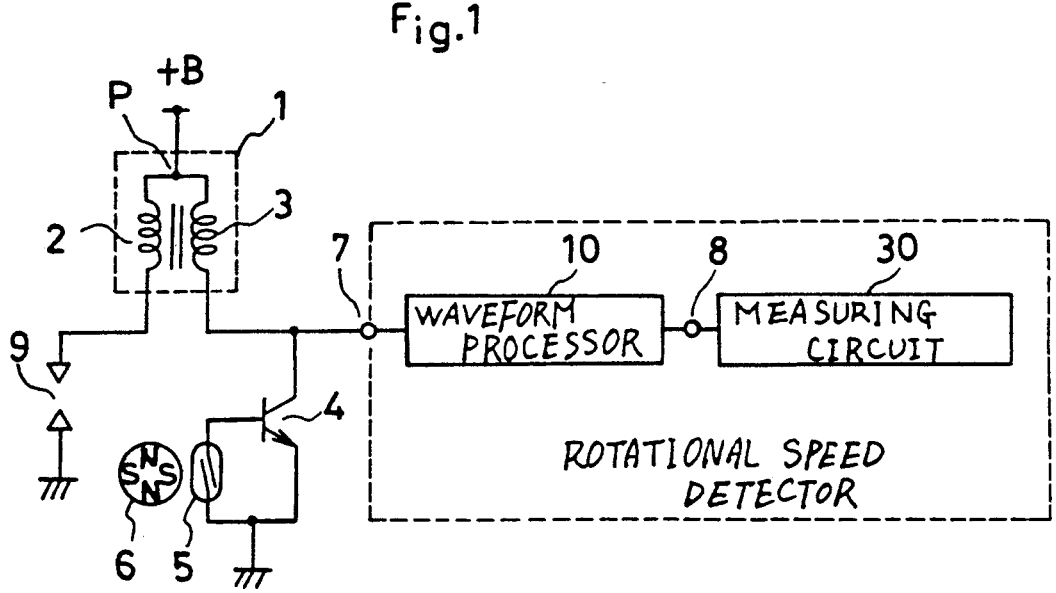
FIG. 1 is a block diagram showing a preferred embodiment of the present invention, a rotation speed detector comprising a waveform processor and a speed measuring circuit.

Referring now to FIG. 1, a block diagram of the illustrated embodiment will be explained. An ignition coil 1 has a primary winding 3 and a secondary winding 2. One end of the primary winding 3 connects to one end of the secondary winding 2 at node P. Node P, which is the connection between primary winding 3 and secondary winding 2, is further connected to a battery (not shown). Accordingly, a D.C. voltage +B is supplied to the node P from the battery. The other end of the secondary winding 2 is connected to a spark plug 9.

The other end of the primary winding 3 is connected to a node 7 of a waveform processor 10 of the present invention indicated by a dashed line box. Further a node 8 of a measuring circuit 30 of the present invention is connected to the waveform processor 10.

Meanwhile, the node 7 between the primary winding 3 and waveform processor 10 is connected to a collector terminal of a transistor 4 of a switching circuit. Further, an emitter terminal of the transistor 4 is grounded, and a pick up coil 5 is interconnected between a base terminal of the transistor 4 and the ground. Thus, the pick-up coil 5 and the transistor 4 constitute the switching device and the voltage signal on the node 7 is an ignition signal.

A permanent magnet 6 is closely positioned to the pick-up coil 5. The permanent magnet 6 is rotated by an internal combustion engine (not shown).

Figure 2:
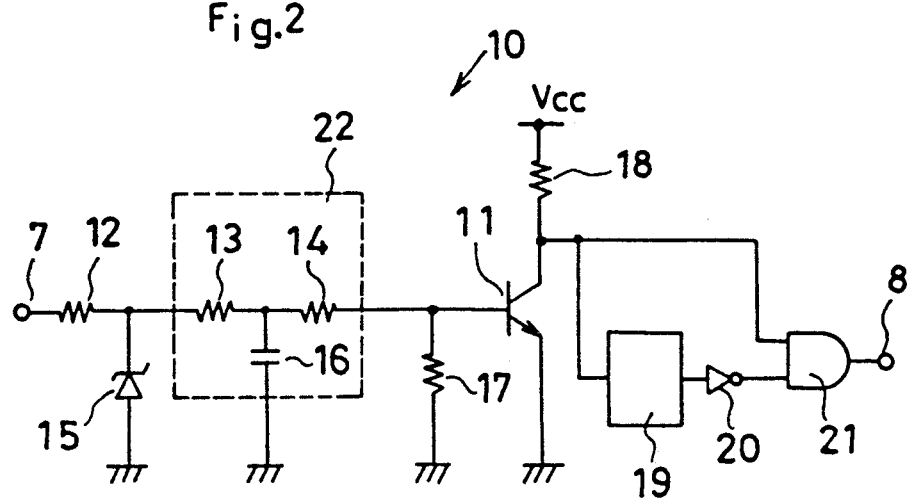
FIG. 2 is a circuit diagram showing a waveform processor according to the preferred embodiment of this invention.

Referring now to FIG. 2, a circuit diagram of the waveform processor 10 will be explained.

A resistor 12 and a Zener diode 15 constitute a voltage clipper for clipping an excessively high voltage which may appear at node 7. The excessively high voltage at 7 is clipped by the Zener diode 15 and converted into a signal with a low peak voltage, for example, about 5 volts. A resistor 13, a resistor 14 and a condenser 16 constitute a low pass filter 22 for blocking high frequency components included in the ignition signal at the node 7. A resistor 17, a resistor 18 and a transistor 11 constitute a waveform shaper for shaping a waveform of an output from the low pass filter 22 into a square wave. Thus, the ignition signal from node 7 is converted into a square wave signal with a low voltage of about 5 volts.

A monostable multi-vibrator 19 and an AND gate 21 are connected to a collector terminal of the transistor 11. The multi-vibrator 19 is triggered by a falling edge of a signal from the collector terminal of the transistor 11 and outputs a signal for a predetermined period of time, for example, about 5 msec. The output from multi-vibrator 19 is applied to the AND gate 21 through an inverter 20. The AND gate 21 prevents any unexpected pulse $F_E$ from being transmitted from the collector terminal of the transistor 11 to the node 8.

Figure 5:
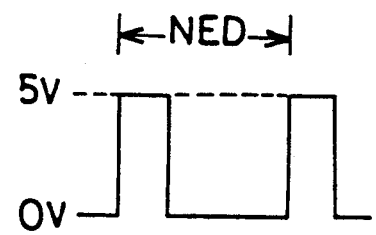
FIG. 5 is a waveform of an output signal from the waveform processor according to the preferred embodiment of this invention.
Figure 7:
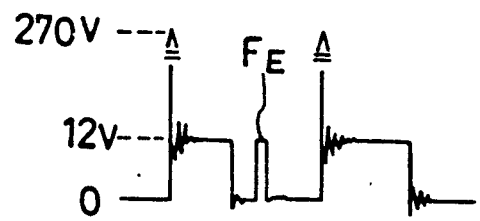

Accordingly, the unexpected signal $F_E$ as well as high frequency components of the ignition signal shown in FIG. 7 are removed, cut off, or blocked so that a desired square wave shown in FIG. 5 is obtained.

This square wave on the node 8 is applied to the measuring circuit 30. Therefore, the measuring circuit 30 can detect the true rotational speed of the engine accurately at any time without falsely measuring the unexpected pulse $F_E$.

Figure 3:
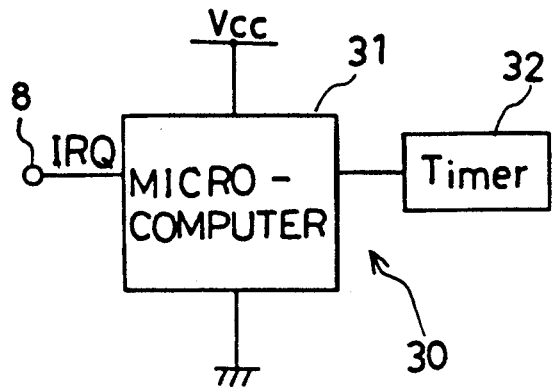
FIG. 3 is a circuit diagram showing a speed measuring means according to the preferred embodiment of this invention.

Referring now to FIG. 3, a circuit diagram of the measuring circuit 30 will be explained.

The node 8 is connected to an IRQ (Interrupt Request) terminal of a microcomputer 31. Further a timer 32 is connected to the microcomputer 31. The timer 32 transmits the time data "RMT" to the microcomputer 31 in response to a request from the microcomputer 31.

Figure 4:
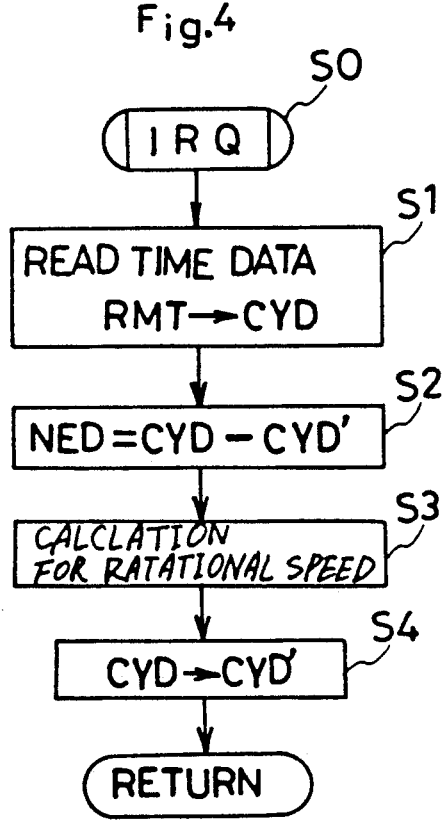
FIG. 4 is a flowchart executed in the speed measuring means according to the preferred embodiment of this invention.
Figure 6:
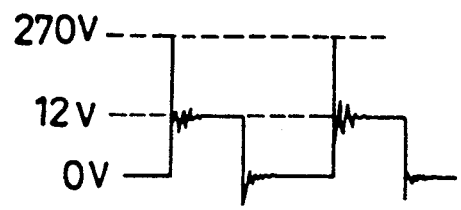
FIGS. 6 and 7 are waveforms of an ignition signal detected at a point between an ignition coil and switching device.

FIG. 4 is a flowchart of an algorithm which is executed respectively in the microcomputer 31. Whenever the rising edge of the signal from node 8 is applied to the IRQ terminal of the microcomputer 31, an IRQ routine S0 is executed.

At a step S1, actual time data "RMT" is read from the timer 32 and memorized in an internal memory of the microprocessor as "CYD". Next, at a step S2, a last time data "CYD" prestored in memory is subtracted from the actual time data "CYD" and a result of the subtraction is stored in an internal memory location as "NED".

At a step S3, the rotational speed is calculated from the memorized subtraction "NED" by means of the following formula:

$$\text{ROTATIONAL SPEED} = A \times 60,000/\text{NED}.$$

In the above formula, "NED" is a period of time (msec) between two separate sequential pulses. Further, "A" is a constant value which is predetermined in accordance with the number of cylinders of the internal combustion engine. For example, the constant value "A" is selected as "1" if the engine has two cylinders, and is selected as "2" if the engine has four cylinders.

At the step S4, the actual time data in the memory as "CYD" is stored in the memory location for "CYD" for the next iteration of the algorithm.

As described above, the engine may be controlled properly, because the rotational speed is detected accurately without measuring the unexpected signal $F_E$ in this embodiment.

At the same time, inaccurate measurements from excessively high voltage pulses may be avoided because the excessively high voltage is cut off by the Zener diode 15 and high frequency components of the ignition signal are blocked by the low pass filter.

What is claimed is:

1. A rotational speed detector for an internal combustion engine comprising:
    a waveform processor for processing an input ignition waveform and for eliminating unwanted pulses therefrom;
    the unwanted pulses being generated within a predetermined period of time after a desired ignition signal pulse in the input ignition waveform appears;
    the waveform processor particularly comprising a square wave waveform shaper responsive to the input ignition waveform for providing a square wave output, a monostable multi-vibrator responsive to the square wave output of the waveform shaper, a logic circuit responsive to the monostable multi-vibrator and the square wave output of the waveform shaper to provide an output signal with unwanted pulses eliminated therefrom; and
    measuring means responsive to the output signal of the logic circuit of the waveform processor for measuring a rotational speed.

2. A rotational speed detector for an internal combustion engine according to claim 1, wherein said waveform processor further includes means for blocking high frequency components of an input ignition waveform.

3. A rotational speed detector for an internal combustion engine according to claim 1, wherein said waveform processor further includes means for clipping excessively high voltages of an input ignition waveform.

4. A rotational speed detector for an internal combustion engine according to claim 2, the high frequency signal component blocking means comprising a low pass filter.

5. A rotational speed detector for an internal combustion engine according to claim 3, the high voltage clipping means particularly comprising a zener diode.

6. A rotational speed detector for an internal combustion engine according to claim 1, the waveform shaper of the waveform processor particularly comprising a transistor switching circuit, the transistor switching circuit being connected to the monostable multi-vibrator and the logic circuit.

7. A rotational speed detector for an internal combustion engine comprising:

a waveform processor for processing an input ignition waveform and for eliminating unwanted pulses therefrom;

the unwanted pulses being generated within a predetermined period of time after a desired ignition signal pulse in the input ignition waveform appears;

the waveform processor particularly comprising a square wave waveform shaper responsive to the input ignition waveform for providing a square wave output, a monostable multi-vibrator responsive to the square wave output of the waveform shaper, a logic circuit responsive to the monostable multi-vibrator and the square wave output of the waveform shaper to provide an output signal with unwanted pulses eliminated therefrom; and measuring means responsive to the output of the signal of the logic circuit of the waveform processor for measuring a rotational speed;

the measuring means comprising means responsive to the waveform processor for determining an amount of time passage between two separate input ignition pulses, and means for calculating a rotational speed based on the determined amount of time between the two separate input ignition pulses and the number of cylinders of the engine.

8. A rotational speed detector for an internal combustion engine according to claim 7, wherein said waveform processor further includes means for blocking high frequency components of an input ignition waveform.

9. A rotational speed detector for an internal combustion engine according to claim 7, wherein said waveform processor further includes means for clipping excessively high voltages of an input ignition waveform.

10. A rotational speed detector for an internal combustion engine according to claim 8, the high frequency signal component blocking means comprising a low pass filter.

11. A rotational speed detector for an internal combustion engine according to claim 4, the high voltage clipping means particularly comprising a zener diode.

12. A rotational speed detector for an internal combustion engine according to claim 7, the waveform shaper of the waveform processor particularly comprising a transistor switching circuit, the transistor switching circuit being connected to the monostable multi-vibrator and the logic circuit.

* * * * *

UNITED STATES PATENT AND TRADEMARK OFFICE
CERTIFICATE OF CORRECTION

PATENT NO. : 5,066,910

DATED : November 19, 1991

INVENTOR(S) : Naoki Sugiyama

It is certified that error appears in the above-identified patent and that said Letters Patent is hereby corrected as shown below:

Col. 6, line 21, after the word claim, delete "4" and substitute therefor --9--.

Signed and Sealed this

Seventh Day of September, 1993

Attest:

BRUCE LEHMAN

Attesting Officer

Commissioner of Patents and Trademarks